(12) United States Patent
Krauss et al.

(10) Patent No.: US 10,104,637 B2
(45) Date of Patent: Oct. 16, 2018

(54) METHOD FOR ROAMING MANAGEMENT IN A MOBILE RADIO UNIT, INFOTAINMENT SYSTEM FOR A MOTOR VEHICLE, AND MOTOR VEHICLE

(71) Applicant: Bayerische Motoren Werke Aktiengesellschaft, Munich (DE)

(72) Inventors: Thomas Krauss, Munich (DE); Robert Tafelmayer, Altfraunhofen (DE)

(73) Assignee: Bayerische Motoren Werke Aktiengesellschaft, Munich (DE)

( * ) Notice: Subject to any disclaimer, the term of this patent is extended or adjusted under 35 U.S.C. 154(b) by 0 days.

(21) Appl. No.: 15/185,643

(22) Filed: Jun. 17, 2016

(65) Prior Publication Data
US 2016/0302171 A1 Oct. 13, 2016

Related U.S. Application Data

(63) Continuation of application No. PCT/EP2014/077227, filed on Dec. 10, 2014.

(30) Foreign Application Priority Data

Dec. 19, 2013 (DE) .................. 10 2013 226 647

(51) Int. Cl.
*H04W 64/00* (2009.01)
*G01C 21/26* (2006.01)
*H04W 8/18* (2009.01)
*H04B 7/185* (2006.01)
*H04W 8/02* (2009.01)
*H04M 1/725* (2006.01)
(Continued)

(52) U.S. Cl.
CPC .......... *H04W 64/006* (2013.01); *G01C 21/26* (2013.01); *H04B 7/18554* (2013.01);
(Continued)

(58) Field of Classification Search
CPC ..... H04W 64/006; H04W 8/02; H04W 8/183; H04W 60/005; H04W 4/046;
(Continued)

(56) References Cited

U.S. PATENT DOCUMENTS 8,781,442 B1* 7/2014 Link, II ................. G08G 1/205
455/411
2002/0177928 A1* 11/2002 Moriguchi .......... H04M 1/6091
701/1
(Continued)

FOREIGN PATENT DOCUMENTS

EP 1 640 923 A1 3/2006
WO WO 03/017706 A1 2/2003
(Continued)

OTHER PUBLICATIONS

German-language Search Report issued in counterpart German Application No. 10 2013 226 647.2 dated May 21, 2014 with partial English translation (12 pages).
(Continued)

*Primary Examiner* — Sharad Rampuria
(74) *Attorney, Agent, or Firm* — Crowell & Moring LLP

(57) ABSTRACT

A method is provided for roaming management in a mobile radio unit, in the memory of which a plurality of different individually activatable identity profiles are stored. The identity profiles includes different options for the mobile radio unit to access different mobile radio networks. In the method, the suitability of a currently active identity profile is automatically verified according to predefined rules and taking into account the current position of the mobile radio unit, and a decision is made as to whether a switch to a currently inactive identity profile should be made. An estimated destination of the mobile radio unit is additionally taken into account when making a decision about switching profiles.

28 Claims, 1 Drawing Sheet

(51) Int. Cl.
*H04W 4/04* (2009.01)
*H04W 48/18* (2009.01)
*H04W 60/00* (2009.01)
*H04M 1/60* (2006.01)
*H04W 4/029* (2018.01)

(52) U.S. Cl.
CPC ............. *H04W 8/02* (2013.01); *H04W 8/183* (2013.01); *H04M 1/6075* (2013.01); *H04M 1/72572* (2013.01); *H04W 4/029* (2018.02); *H04W 4/046* (2013.01); *H04W 48/18* (2013.01); *H04W 60/005* (2013.01)

(58) Field of Classification Search
CPC ..... H04W 4/028; H04W 48/18; H04W 36/14; H04W 48/16; H04W 60/00; H04W 88/06; H04W 8/06; H04W 8/12; H04W 8/26; H04B 7/18554; G01C 21/26; H04M 1/6075; H04M 1/72572
USPC .................................. 455/432.1, 435.2, 575.9
See application file for complete search history.

(56) References Cited

U.S. PATENT DOCUMENTS

| | | | |
|---|---|---|---|
| 2009/0181651 A1* | 7/2009 | Klassen | H04M 1/72547 455/414.1 |
| 2009/0209282 A1* | 8/2009 | Kobayashi | H04W 28/18 455/552.1 |
| 2011/0039527 A1* | 2/2011 | Yi | H04W 48/18 455/418 |
| 2011/0081951 A1 | 4/2011 | Hwang | |
| 2011/0117909 A1 | 5/2011 | Cao et al. | |
| 2012/0275445 A1* | 11/2012 | Karlsson | H04W 8/183 370/338 |
| 2013/0310108 A1 | 11/2013 | Altman | |
| 2013/0329639 A1 | 12/2013 | Wietfeldt et al. | |
| 2016/0156607 A1* | 6/2016 | Kim | H04L 63/08 726/7 |
| 2016/0157085 A1* | 6/2016 | Yeoum | H04M 3/387 455/435.1 |

FOREIGN PATENT DOCUMENTS

WO   WO 2011/161490 A1   12/2011
WO   WO 2014/151583 A1   9/2014

OTHER PUBLICATIONS

International Search Report (PCT/ISA/210) issued in PCT Application No. PCT/EP2014/077227 dated Mar. 18, 2015 with English translation (10 pages).

German-language Written Opinion (PCT/ISA/237) issued in PCT Application No. PCT/EP2014/077227 dated Mar. 18, 2015 (3 pages).

* cited by examiner

METHOD FOR ROAMING MANAGEMENT IN A MOBILE RADIO UNIT, INFOTAINMENT SYSTEM FOR A MOTOR VEHICLE, AND MOTOR VEHICLE

CROSS REFERENCE TO RELATED APPLICATIONS

This application is a continuation of PCT International Application No. PCT/EP2014/077227, filed Dec. 10, 2014, which claims priority under 35 U.S.C. § 119 from German Patent Application No. 10 2013 226 647.2, filed Dec. 19, 2013, the entire disclosures of which are herein expressly incorporated by reference.

BACKGROUND AND SUMMARY OF THE INVENTION

The invention relates to a method for roaming management in a mobile radio unit whose memory stores multiple different, individually activable identity profiles that include different access options for the mobile radio unit in respect of different mobile radio networks. In the method, the suitability of a currently active identity profile is automatically verified according to prescribed rules and taking into account a current position of the mobile radio unit, and a decision is made as to whether to switch to a currently inactive identity profile.

The invention further relates to an infotainment system for a motor vehicle, comprising
 a mobile radio unit as transmission and reception unit, whose memory stores multiple different, individually activable identity profiles that includes different access options for the mobile radio unit in respect of different mobile radio networks,
 a navigation unit that is functionally coupled to the mobile radio unit,
 a control unit that is functionally coupled to the mobile radio unit and to the navigation unit and that is set up to use automation based on prescribed rules and taking account of a current position of the mobile radio unit to check a suitability of a currently active identity profile and to make a decision about switching to a currently inactive identity profile.

Finally, the invention relates to a motor vehicle that is equipped with an infotainment system of this kind.

Roaming management methods of the type in question are known from WO 2011/161490 A1. This document discloses mobile radio units equipped with a SIM card (SIM: subscriber identification module). In this case, the SIM card has two identity profiles between which it is possible to change as required. According to current mobile radio standards, a SIM card stores a plurality of files that contain operator- and user-specific data and also data about mobile radio networks that are currently available. These files are read and/or edited when the mobile radio unit interacts with mobile radio networks. Particular importance is held by what is known as roaming, which involves a user transporting his mobile radio unit into regions outside the coverage area of his home network operator. In order to be able to use mobile radio services therein, he needs to dial up into networks of extraneous operators, the nature and scope and also costs of the services used being dependent on specific agreements between the home network operator and the operator of those networks that are currently being used. In order to prevent the user from using inadequate and/or overpriced services in a network with whose operator the home network operator has no or inadequate agreements while a better supply of services at cheaper prices can be used in another mobile radio network that is likewise available, there is a need for management that measures up to the respective outline of the individual case. Such a management method is normally performed in automated fashion, since manual management by the user would require the latter to have detailed knowledge of existing agreements.

In the aforementioned document, the SIM card stores two identity profiles for the user, namely a home profile and a roaming profile. The home profile is used for handling service use in the home network; the roaming profile is used for handling service use in extraneous networks. As an essential component of each profile, current mobile radio standards define what is known as the IMSI (international mobile subscriber identity). The IMSI here is a unifocal subscriber identifier and is associated with a mobile radio operator having a country identifier (MCC: mobile country code) and a mobile radio operator identifier (MNC: mobile network code).

Roaming management involves the respective current position of the mobile radio unit being ascertained. This can be accomplished by use of satellite-controlled position finding (e.g. GPS) or in interaction with elements of a land-based mobile radio network. On the basis of the determined position, a control unit coupled to the mobile radio unit uses prescribed rules to compute which of the stored IMSIs needs to be activated each time in order to be able to use required mobile radio services in optimum fashion, this being dependent particularly on the specific dialup into one of the mobile radio networks available at the ascertained position. This system has disadvantages in cases in which the user is located in a border region between the networks of different operators. This can give rise to the rules for selecting the appropriate IMSI, which are essentially focused on the current position, leading to quickly alternating changeover between the IMSIs. This is the case particularly with fast-moving mobile radio units, for example with mobile radio units that are used as an interface for an infotainment system in a motor vehicle. In many cases, an IMSI change leads to at least temporary connection interruption, for the most part at any rate at least to changes in the currently available services.

The object of the present invention is to provide a roaming management method that leads to fewer disconnections even in border regions.

A further object of the invention is to provide an appropriate infotainment system for motor vehicles.

The first-mentioned object is achieved by a method for roaming management in a mobile radio unit whose memory stores multiple different, individually activable identity profiles that comprise different access options for the mobile radio unit in respect of different mobile radio networks, wherein automation based on prescribed rules and taking account of a current position of the mobile radio unit is used to check a suitability of a currently active identity profile and to make a decision about switching to a currently inactive identity profile. The decision about the change of profile additionally takes account of an estimated movement destination for the mobile radio unit.

The second-mentioned objects is further achieved by an infotainment system for a motor vehicle, comprising a mobile radio unit as transmission and reception unit, whose memory stores multiple different, individually activable identity profiles that comprise different access options for the mobile radio unit in respect of different mobile radio networks, a navigation unit that is functionally coupled to the mobile radio unit, and a control unit that is functionally coupled to the mobile radio unit and to the navigation unit and that is set up to use automation based on prescribed rules and taking account of a current position of the mobile radio unit to check a suitability of a currently active identity profile and to make a decision about switching to a currently inactive identity profile. The control unit is further set up to additionally take account of an estimated movement destination for the mobile radio unit in the decision about the change of profile, which movement destination is retrievable from the navigation unit.

An aspect of the invention is that not only a current position of the mobile radio unit but also, in addition, a movement destination for the mobile radio unit, which is ascertained by estimation, is taken into account when a decision about a possible change of identity profile needs to be made in an automated fashion. The result of this is that even in cases in which a change of profile on the basis of the current position would lead to currently cheaper service use, a change of profile that is possibly linked to disconnection can be avoided in view of the fact that the mobile radio unit will, in all probability, shortly be again located at a position at which the current profile will deliver better performance than the currently optimum profile. In this respect, the method according to the invention can be used to temporarily tolerate less than optimum service use, which is significantly overcompensated for, in terms of overall performance, by the advantage of disconnection being avoided, however. Only in cases in which it becomes clear from the estimated movement destination that the currently optimum profile would also have advantages over alternatives in the longer term is a change of profile initiated and disconnection tolerated. Overall, this allows minimization of the number of disconnections that are inconvenient for the user and of the costs for services that are used.

In one preferred embodiment of the invention, a navigation destination that is active in a navigation unit functionally coupled to the mobile radio unit is used as the estimated movement destination. In other words, the estimation, according to the invention, of the movement destination is effected on the basis of an explicit input into a navigation unit. In this connection, it should be pointed out that terms such as mobile radio unit, control unit, navigation unit, etc., are always intended to be understood in the present context in purely functional terms and not necessarily in design terms. In particular, components that contain functional mobile radio, control and navigation units, etc., in a common components are contemplated. However, it is naturally also possible for different components to be functionally coupled. Both variants are intended to be covered by the present invention.

Alternatively, a probable movement destination can be used as the estimated movement destination, wherein the probable movement destination used is a movement destination that is selected based on prescribed rules using current movement circumstance parameters from a database that comprises earlier movement destinations for the mobile radio unit together with the associated movement circumstance parameters thereof. By way of example, such a database contains an association for earlier movement destinations with starting times, calendar dates, starting directions of travel, etc. Routes that are frequently traveled at the same times of day, such as a distance between the home and the workplace, for example, therefore result in high entry numbers in the database. If current journey circumstance parameters are akin to frequently stored journey circumstance parameters, there is a high degree of probability that the same movement destination is also valid. In accordance with the explained embodiment of the invention, this probable movement destination is used as the estimated movement destination, which influences the current decision by means of a change of profile.

In one preferred embodiment of the invention, the mobile radio unit is a transmission and reception unit of an infotainment system in a motor vehicle. Modern motor vehicles are equipped with complex systems for entertainment and obtaining information, for example about traffic situations, news, etc. The relevant data flow via a mobile radio unit in the motor vehicle and via devices interacting with said mobile radio unit in land-based mobile radio networks. As already mentioned at the outset, efficient roaming management is of particular importance particularly in fast-moving mobile radio units. The cited mobile radio units of infotainment systems in motor vehicles are particularly affected thereby.

Favorably, the memory containing the identity profiles includes a SIM card that stores a plurality of IMSIs that each represent an identity profile. This approach follows the approach of storing multiple IMSIs on a SIM card that is known from the prior art. Alternatively, provision may also be made for the memory containing the identity profiles to include a plurality of SIM cards that each store an IMSI representing an identity profile. This variant has advantages in view of upgradeability and expandability of the system.

The current position of the mobile radio unit, which continues to be necessary for efficient roaming management, is preferably determined by involving satellite-assisted position finding by means of a position finding unit that is functionally coupled to the mobile radio unit. Typically, such a position finding unit is connected to the worldwide GPS system and is part of an ordinary navigation system.

Alternatively or additionally, provision may be made for the current position of the mobile radio unit to be determined by involving position-related data from network equipment elements that interchange data with the mobile radio unit. Land-based mobile radio networks are known to be comparatively small-celled, which means that the current position of the mobile radio unit can be determined from the data interchanged with a mobile radio unit in the course of a specific interaction and/or by way of signal strength comparison for signals from different transmission stations.

Other objects, advantages and novel features of the present invention will become apparent from the following detailed description of one or more preferred embodiments when considered in conjunction with the accompanying drawings.

DETAILED DESCRIPTION OF THE DRAWINGS

Figure 1:
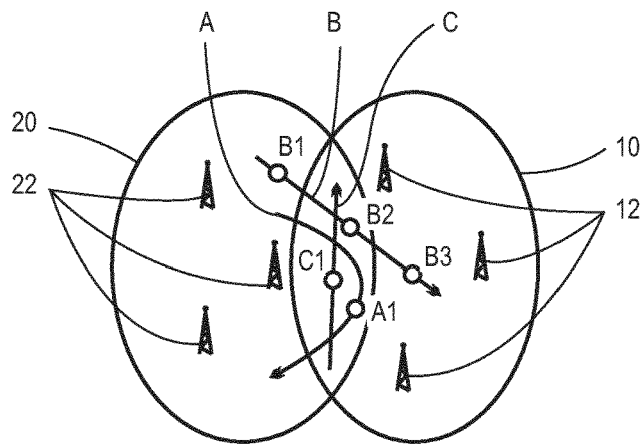
FIG. 1 is a schematic illustration of different situations handled by the method according to the invention.
Figure 2:
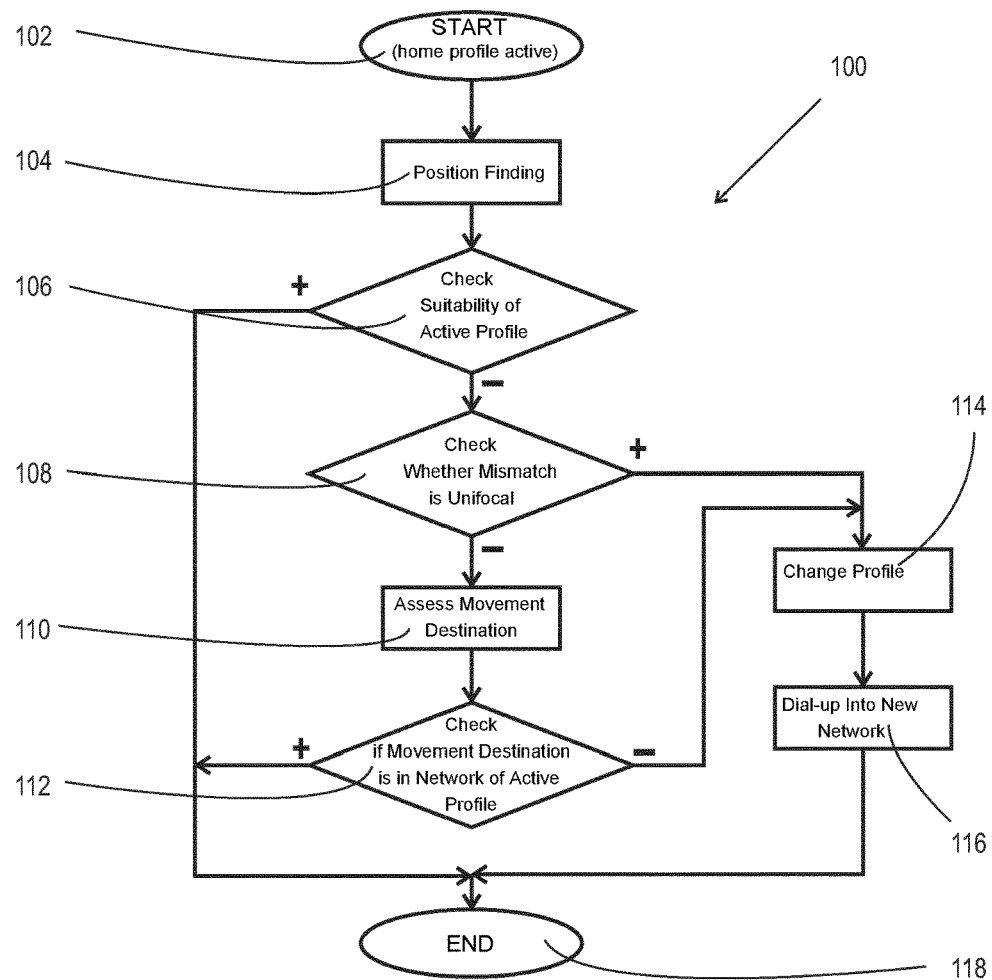
FIG. 2 is a flowchart for an embodiment of the method according to the invention.

FIG. 1 shows a highly schematic illustration of typical situations that are handled by the method according to the invention, one embodiment of which is represented as a flowchart in FIG. 2.

FIG. 1 shows two mobile radio networks 10, 20 of different mobile radio operators, each of which is made up of a multiplicity of different mobile radio equipment elements that have various radio towers 12, 22 shown representatively in each network 10, 20. The coverage areas of the mobile radio networks 10, 20 overlap on an area by area basis. It is subsequently assumed that a user has signed an explicit mobile radio agreement with the mobile radio operator of the mobile radio network 20. The mobile radio network 20 is therefore his home network. The mobile radio network 10 is an extraneous network, but one in which he can retrieve mobile radio services by means of what is known as roaming, since appropriate roaming agreements exist between the operators of the mobile radio networks 10, 20. Nevertheless, in view of the quality of the mobile radio services used and the associated costs, it is normally cheaper to use the services via the home network rather than via the extraneous network. So as also to be able to use cheap services in the extraneous network, however, the user in the present case has a dual SIM card in his mobile radio unit. This may be two different, physical SIM cards that each store an identity profile for the user. On the other hand, it may also be a single physical SIM card that stores two identity profiles for the user. In order to use services in a mobile radio network 10, 20, the user needs to dial up into said mobile radio network using the respectively appropriate identity profile.

Let us assume that the mobile radio unit having the dual SIM card is the transmission and reception unit of an infotainment system in a motor vehicle in which the user may be traveling on the trajectories A, B, C in the border region between the mobile radio networks 10, 20. The trajectories A, B, C each show position markings A1, B1, B2, B3 and C1 that are representative of different cases that will be explained below by resorting to the flowchart in FIG. 2.

The flowchart in FIG. 2 shows an embodiment of the method 100 according to the invention and starts in initial block 102, and it may be assumed that the home profile tailored to the home network 20 is activated on the dual SIM card. The identity profile tailored to the extraneous network 10, which will be referred to as the roaming profile in this case, is assumed to be deactivated.

In the step 104, a current position of the mobile radio unit is determined. This can be accomplished by means of a satellite-assisted position finding system or by evaluating received mobile radio data, for example. Alternatively or additionally, triangulation methods pertaining to mobile radio equipment elements 12, 22 can be used to determine the current position of the user. This establishes whether the user is in a border region between different mobile radio networks.

First of all, it may be assumed that the user is located on the trajectory A at the position point A1. In checking step 106, a check is performed to determine whether the activated profile is suitable. By way of example, it is possible to determine whether the currently active profile is suited to that mobile radio network that currently provides the highest reception quality, this being appropriate particularly when the user is currently not retrieving services, and hence his mobile radio unit is in what is known as idle mode. If services are currently being retrieved, an additional modem would be necessary for a reception strength comparison; if one is not present, it is possible to resort to other suitability criteria, which a person skilled in the art can select in the individual case. At the point A1, which is situated in the border region between the mobile radio networks 10, 20 right at the edge of the home network 20, the currently active profile is not apt.

Accordingly, the method proceeds to checking step 108, where a check is performed to determine whether the mismatch in the active identity profile is unifocal, i.e. whether it is possible for services to be used exclusively via the extraneous network 10 or—possibly with reduced quality—also via the home network 20. Since the position point A1 is situated in the region of overlap between the two networks 10, 20, the latter is the case. The mismatch in the active identity profile is therefore not unifocal. The method transitions to step 110, where an assessment of the location of the movement destination of the vehicle takes place according to the invention. By way of example, this destination assessment can be effected by means of an explicit destination input in the navigation system of the motor vehicle, which is read. Alternatively, a statistically based destination assessment can be performed. In the case of trajectory A, the destination is in the home network outside the border region. In checking step 112, which checks whether the movement destination is located in that mobile radio network that is suited to the currently active identity profile, the decision has a positive outcome, which means that the method transitions to the method end 118 without a change of profile.

A second case that may be considered is the case in which the position finding step 104 establishes that the motor vehicle is situated at the location B1, i.e. exclusively in the reception area of the network 20. In checking step 106, it is then established that the activated identity profile and the received mobile radio network match, which means that there is no need for a change and the method can readily transition to the final step 118.

A third case that may be considered is the case in which the position finding step in 104 establishes that the motor vehicle is situated at position B2. This case differs from the first-mentioned case above, in which the motor vehicle was situated at the location A1, only by virtue of the destination of the trajectory. Except for the destination assessment step 110, reference may therefore be made to what has been stated above. In checking step 112, it is now established, by contrast, that the movement destination is situated in the extraneous network 10, for which the roaming identity profile would be suitable. This means that the loss of quality from the received services that is linked to the migration from the home network will probably continue and a change of identity profile and dialup into the extraneous network will be unavoidable sooner or later. In this situation, it appears favorable to perform a change of profile straightaway in order to optimize services. This is effected in step 114, which is followed in step 116 by dialup into the extraneous network under the new identity profile. Typically, the change of identity also includes fresh initialization of the SIM card in accordance with the relevant mobile radio standards. Following dialup into the new network 10, the method ends with step 118.

A fourth case that may be considered is the case in which the motor vehicle is situated in the position B3. Except for step 108, reference can be made to the first case outlined above. It is now established, by contrast, in step 108 that the mismatch between the active profile and the strongest received network, namely between the home profile and the extraneous network 10, is unifocal because no further services are receivable at the position B3 via the home network. Therefore, a change of profile without a further check is absolutely necessary. The method therefore transitions from checking step 108 directly to the change of profile 114 and dialup 116 into the new network 10.

Finally, there remains the case in which the motor vehicle is moving on the trajectory C and is situated at point C1. Except for checking step 112, reference can be made to the first case outlined above. Now, however, the question posed in checking step 112 regarding which of the available networks contains the estimated movement destination cannot be answered unifocally. To resolve this uncertainty, different strategies can be adopted. One strategy would be for no change of profile to take place in this case. Such a strategy would come under the general objective of minimizing changes of profile with disconnections that are possibly caused thereby. A different strategy that comes under the general objective of continually optimum service use could force a change of profile on the basis of the strength of the simultaneously received networks, which would correspond to an approach based on the prior art. The same as in the case of a trajectory C remaining in the border region applies to the case in which a movement destination cannot be assessed.

Naturally, the embodiments that are discussed in the specific description and shown in the figures are only illustrative exemplary embodiments of the present invention. In light of the present disclosure, a person skilled in the art is provided with a broad spectrum of variation options. In particular, the method according to the invention is not limited to systems with a dual SIM card. Systems having SIM cards with more than two stored identity profiles or systems having more than two SIM cards are naturally likewise contemplated and are intended to be covered by the invention. The method according to the invention can be performed on a periodically repeated basis or for a reason each time.

LIST OF REFERENCE SYMBOLS

10 Extraneous network
12 Equipment in 10
20 Home network
22 Equipment in 20
A, B, C Trajectories
A1, B1, B2, B3, C1 Position points
100 Method
102 Start
104 Position finding step
106 Checking step for the aptness of an active profile
108 Checking step for the unifocal nature of the mismatch in the active profile
110 Movement destination assessment step
112 Checking step for the association of the estimated movement destination with a network
114 Profile change step
116 Dialup step into new network
118 End The foregoing disclosure has been set forth merely to illustrate the invention and is not intended to be limiting. Since modifications of the disclosed embodiments incorporating the spirit and substance of the invention may occur to persons skilled in the art, the invention should be construed to include everything within the scope of the appended claims and equivalents thereof.

What is claimed is:

1. A method for roaming management in a mobile radio unit having a memory in which are stored a plurality of different individually activatable identity profiles,
said identity profiles comprising different options for the mobile radio unit to access different mobile radio networks, the method comprising the acts of:
automatically checking a suitability of a currently active identity profile according to prescribed rules and
taking into account a current position of the mobile radio unit, and making a decision about whether to switch to a currently inactive identity profile,
wherein the decision about whether to switch to the currently inactive identity profile takes into account an estimated movement destination of the mobile radio unit which differs from the current position of the mobile radio unit, and
wherein a navigation destination active in a navigation unit that is functionally coupled to the mobile radio unit is used as the estimated movement destination that is taken into account.

2. The method according to claim 1, wherein:
a probable movement destination is used as the estimated movement destination that is taken into account,
the probable movement destination that is used is a movement destination selected based on prescribed rules using current movement circumstance parameters from a database that comprises earlier movement destinations for the mobile radio unit together with associated movement circumstance parameters thereof.

3. The method according to claim 1, wherein the mobile radio unit is a transmission and reception unit of an infotainment system in a motor vehicle.

4. The method according to claim 1, wherein the memory of the mobile radio unit containing the plurality of different individually activatable identity profiles comprises a SIM card, the SIM card storing a plurality of IMSIs that each represent an individual identity profile.

5. The method according to claim 1, wherein the memory of the mobile radio unit containing the plurality of individually activatable identity profiles comprises a plurality of SIM cards, each storing an IMSI representing an individual identity profile.

6. The method according to claim 1, wherein the current position of the mobile radio unit is determined via satellite-assisted position finding by a position finding unit functionally coupled to the mobile radio unit.

7. The method according to claim 1, wherein the current position of the mobile radio unit is determined via position-related data from network equipment components that interchange data with the mobile radio unit.

8. An infotainment system for a motor vehicle, comprising:
a mobile radio unit having transmission and reception capability,
a memory of the mobile radio unit storing a plurality of different individually activatable identity profiles,
said identity profiles comprising different options for the mobile radio unit to access different mobile radio networks;
a navigation unit functionally coupled to the mobile radio unit; and
a control unit operatively coupled to the mobile radio unit and to the navigation unit, the control unit being configured to:
automatically check a suitability of a currently active identity profile according to prescribed rules and
taking into account a current position of the mobile radio unit, and make a decision about whether to switch to a currently inactive identity profile,
wherein the decision about whether to switch to the currently inactive identity profile takes into account an estimated movement destination of the mobile radio unit which differs from the current position of the mobile radio unit, and wherein a navigation destination active in a navigation unit that is functionally coupled to the mobile radio unit is used as the estimated movement destination that is taken into account.

9. The infotainment system according to claim 8, wherein:
a probable movement destination is used as the estimated movement destination that is taken into account,
the probable movement destination that is used is a movement destination selected based on prescribed rules using current movement circumstance parameters from a database that comprises earlier movement destinations for the mobile radio unit together with associated movement circumstance parameters thereof.

10. The infotainment system according to claim 8, wherein the mobile radio unit is a transmission and reception unit of an infotainment system in a motor vehicle.

11. The infotainment system according to claim 8, wherein the memory of the mobile radio unit containing the plurality of different individually activatable identity profiles comprises a SIM card, the SIM card storing a plurality of IMSIs that each represent an individual identity profile.

12. The infotainment system according to claim 8, wherein the memory of the mobile radio unit containing the plurality of individually activatable identity profiles comprises a plurality of SIM cards, each storing an IMSI representing an individual identity profile.

13. The infotainment system according to claim 8, wherein the current position of the mobile radio unit is determined via satellite-assisted position finding by a position finding unit functionally coupled to the mobile radio unit.

14. The infotainment system according to claim 8, wherein the current position of the mobile radio unit is determined via position-related data from network equipment components that interchange data with the mobile radio unit.

15. A motor vehicle, comprising:
an infotainment system for the motor vehicle, the infotainment system comprising:
a mobile radio unit having transmission and reception capability,
a memory of the mobile radio unit storing a plurality of different individually activatable identity profiles, said identity profiles comprising different options for the mobile radio unit to access different mobile radio networks;
a navigation unit functionally coupled to the mobile radio unit; and
a control unit operatively coupled to the mobile radio unit and to the navigation unit, the control unit being configured to:
automatically check a suitability of a currently active identity profile according to prescribed rules and
taking into account a current position of the mobile radio unit, and make a decision about whether to switch to a currently inactive identity profile,
wherein the decision about whether to switch to the currently inactive identity profile takes into account an estimated movement destination of the mobile radio unit which differs from the current position of the mobile radio unit, and
wherein a navigation destination active in a navigation unit that is functionally coupled to the mobile radio unit is used as the estimated movement destination that is taken into account.

16. A method for roaming management in a mobile radio unit having a memory in which are stored a plurality of different individually activatable identity profiles,
said identity profiles comprising different options for the mobile radio unit to access different mobile radio networks, the method comprising the acts of:
automatically checking a suitability of a currently active identity profile according to prescribed rules and
taking into account a current position of the mobile radio unit, and making a decision about whether to switch to a currently inactive identity profile,
wherein the decision about whether to switch to the currently inactive identity profile takes into account an estimated movement destination of the mobile radio unit which differs from the current position of the mobile radio unit,
wherein a probable movement destination is used as the estimated movement destination that is taken into account, and
wherein the probable movement destination that is used is a movement destination selected based on prescribed rules using current movement circumstance parameters from a database that comprises earlier movement destinations for the mobile radio unit together with associated movement circumstance parameters thereof.

17. The method according to claim 16, wherein the mobile radio unit is a transmission and reception unit of an infotainment system in a motor vehicle.

18. The method according to claim 16, wherein the memory of the mobile radio unit containing the plurality of different individually activatable identity profiles comprises a SIM card, the SIM card storing a plurality of IMSIs that each represent an individual identity profile.

19. The method according to claim 16, wherein the memory of the mobile radio unit containing the plurality of individually activatable identity profiles comprises a plurality of SIM cards, each storing an IMSI representing an individual identity profile.

20. The method according to claim 16, wherein the current position of the mobile radio unit is determined via satellite-assisted position finding by a position finding unit functionally coupled to the mobile radio unit.

21. The method according to claim 16, wherein the current position of the mobile radio unit is determined via position-related data from network equipment components that interchange data with the mobile radio unit.

22. An infotainment system for a motor vehicle, comprising:
a mobile radio unit having transmission and reception capability, a memory of the mobile radio unit storing a plurality of different individually activatable identity profiles,
said identity profiles comprising different options for the mobile radio unit to access different mobile radio networks;
a navigation unit functionally coupled to the mobile radio unit; and
a control unit operatively coupled to the mobile radio unit and to the navigation unit, the control unit being configured to:
automatically check a suitability of a currently active identity profile according to prescribed rules and
taking into account a current position of the mobile radio unit, and make a decision about whether to switch to a currently inactive identity profile,
wherein the decision about whether to switch to the currently inactive identity profile takes into account an estimated movement destination of the mobile radio unit which differs from the current position of the mobile radio unit,
wherein a probable movement destination is used as the estimated movement destination that is taken into account, and
wherein the probable movement destination that is used is a movement destination selected based on prescribed rules using current movement circumstance parameters from a database that comprises earlier movement destinations for the mobile radio unit together with associated movement circumstance parameters thereof.

23. The infotainment system according to claim 22, wherein the mobile radio unit is a transmission and reception unit of an infotainment system in a motor vehicle.

24. The infotainment system according to claim 22, wherein the memory of the mobile radio unit containing the plurality of different individually activatable identity profiles comprises a SIM card, the SIM card storing a plurality of IMSIs that each represent an individual identity profile.

25. The infotainment system according to claim 22, wherein the memory of the mobile radio unit containing the plurality of individually activatable identity profiles comprises a plurality of SIM cards, each storing an IMSI representing an individual identity profile.

26. The infotainment system according to claim 22, wherein the current position of the mobile radio unit is determined via satellite-assisted position finding by a position finding unit functionally coupled to the mobile radio unit.

27. The infotainment system according to claim 22, wherein the current position of the mobile radio unit is determined via position-related data from network equipment components that interchange data with the mobile radio unit.

28. A motor vehicle, comprising:
an infotainment system for the motor vehicle, the infotainment system comprising:
a mobile radio unit having transmission and reception capability,
a memory of the mobile radio unit storing a plurality of different individually activatable identity profiles, said identity profiles comprising different options for the mobile radio unit to access different mobile radio networks;
a navigation unit functionally coupled to the mobile radio unit; and
a control unit operatively coupled to the mobile radio unit and to the navigation unit, the control unit being configured to:
automatically check a suitability of a currently active identity profile according to prescribed rules and
taking into account a current position of the mobile radio unit, and make a decision about whether to switch to a currently inactive identity profile,
wherein the decision about whether to switch to the currently inactive identity profile takes into account an estimated movement destination of the mobile radio unit which differs from the current position of the mobile radio unit,
wherein a probable movement destination is used as the estimated movement destination that is taken into account, and
wherein the probable movement destination that is used is a movement destination selected based on prescribed rules using current movement circumstance parameters from a database that comprises earlier movement destinations for the mobile radio unit together with associated movement circumstance parameters thereof.

* * * * *